US008925718B2

(12) United States Patent
Miles et al.

(10) Patent No.: US 8,925,718 B2
(45) Date of Patent: Jan. 6, 2015

(54) MODULAR SUPPORT SYSTEM

(71) Applicant: Engineeringology Inc., Amaranth (CA)

(72) Inventors: William Keith Miles, Mono (CA); Kamalakar Gutta, Brampton (CA); Michael John Garbaty, Mono (CA); Douglas James Wilson, Halton Hills (CA)

(73) Assignee: Engineeringology Inc., Amaranth (CA)

( * ) Notice: Subject to any disclaimer, the term of this patent is extended or adjusted under 35 U.S.C. 154(b) by 29 days.

(21) Appl. No.: 13/788,192

(22) Filed: Mar. 7, 2013

(65) Prior Publication Data

US 2014/0251768 A1 Sep. 11, 2014

(51) Int. Cl.
*B65G 21/14* (2006.01)
*B65G 41/00* (2006.01)

(52) U.S. Cl.
CPC .................................... *B65G 41/00* (2013.01)
USPC .................. 198/860.2; 198/860.1; 198/861.1

(58) Field of Classification Search
USPC ................................ 198/860.1, 860.2, 861.1
See application file for complete search history.

(56) References Cited

U.S. PATENT DOCUMENTS 4,467,914 A 8/1984 Trammel et al.
4,524,864 A * 6/1985 Peterson, II .................. 198/828
4,724,953 A * 2/1988 Winchester ................ 198/836.3
4,760,913 A 8/1988 Tschantz
4,763,702 A 8/1988 High, Jr. et al.
4,811,829 A 3/1989 Nakazawa et al.
4,951,809 A 8/1990 Boothe et al.
5,131,531 A * 7/1992 Chambers .................. 198/860.2
5,174,439 A 12/1992 Spangler et al.
5,178,263 A 1/1993 Kempen
5,188,479 A 2/1993 Nehls
5,203,442 A * 4/1993 Oury et al. .................... 198/313
5,377,810 A 1/1995 Lehtonen et al.
5,421,451 A * 6/1995 Easton ...................... 198/860.1
5,529,171 A * 6/1996 Langenbeck ............. 198/860.1
5,598,784 A 2/1997 Kubsik et al.
5,715,931 A 2/1998 Langenbeck
6,056,252 A * 5/2000 Johannsen ................ 248/188.3
6,302,265 B1 10/2001 Cunningham
6,427,831 B1 * 8/2002 Norton .......................... 198/841
6,453,657 B1 9/2002 Teravainen
6,698,584 B1 3/2004 Ray
6,705,461 B2 * 3/2004 Kuharevicz et al. ....... 198/861.1
6,854,397 B2 * 2/2005 Terajima et al. ................ 104/95
6,929,113 B1 * 8/2005 Hoover et al. ................ 198/812
7,128,201 B2 * 10/2006 Jones ........................... 198/615

(Continued)

*Primary Examiner* — Douglas Hess

(74) *Attorney, Agent, or Firm* — Gifford, Krass, Sprinkle, Anderson & Citkowski, P.C.

(57) ABSTRACT

A modular support system has individual frame modules each of which is formed by a series of standardized components that are secured together to form a generally elongate support structure for various uses, in particular a support structure for a conveyor. A truss frame module and a channel frame module are disclosed wherein both of the frame modules include a pair of elongate side frame members that are laterally spaced-apart and generally parallel, these frame members being secured together by a series of laterally-extending and transverse frame members. Specialized connectors attach to the ends of the laterally-extending and transverse frame members, which in turn are secured to the frame members. The components of each of the frame modules are substantially identical to the other so that they can be inverted or reversed without affecting assembly of the frame. The side frame members are made by profile cutting and roll forming an elongate metal plate.

19 Claims, 8 Drawing Sheets

10 44 16 24 52 36 40 36 22 24 48 30 28 16 36 46 36 12 56 50 36 68 31 a 52 14 30 18 14 30 56 64 28 36 30 36 36 36 a 12 28 36 56 26 70 40 44 36 48 40 36 72 68 36 31 46 26 36 72 64 36

(56) References Cited

U.S. PATENT DOCUMENTS

| | | | | |
|---|---|---|---|---|
| 7,178,665 | B2 * | 2/2007 | Ryan | 198/860.1 |
| 7,284,947 | B1 * | 10/2007 | Felton | 414/787 |
| 7,357,238 | B2 * | 4/2008 | Zeigler | 193/35 TE |
| 7,469,782 | B2 | 12/2008 | Hutton | |
| 7,618,231 | B2 | 11/2009 | Felton | |
| 7,673,741 | B2 * | 3/2010 | Nemedi | 198/841 |
| 7,784,597 | B2 | 8/2010 | Frankl et al. | |
| 7,837,030 | B2 * | 11/2010 | Daly et al. | 198/861.1 |
| 7,849,641 | B2 * | 12/2010 | Johannsen | 52/121 |
| 7,874,419 | B2 | 1/2011 | Hosch et al. | |
| 8,011,498 | B2 | 9/2011 | Trivette | |
| 8,136,804 | B2 | 3/2012 | Leith | |
| 8,291,653 | B2 * | 10/2012 | Suarez et al. | 52/173.3 |
| 8,562,241 | B2 * | 10/2013 | Klepack et al. | 403/262 |
| 8,611,790 | B2 * | 12/2013 | Souda | 399/121 |
| 2005/0211534 | A1 | 9/2005 | Tefend | |
| 2012/0138423 | A1 | 6/2012 | Fehr et al. | |

* cited by examiner 52
50
52
50
52
50
56
56
56
58
60
58
60
56
50
60
60
52
58

10
64
40
12
56
50
52
56
52
56
64
68
50
52
56
30
64
50
12
52
14
30
40
28
72
40

31
68
70
72
64

700
726
724
36
717
708
716
702
722
718
712
704
710
706
720
50
52
56
30
28
31
714

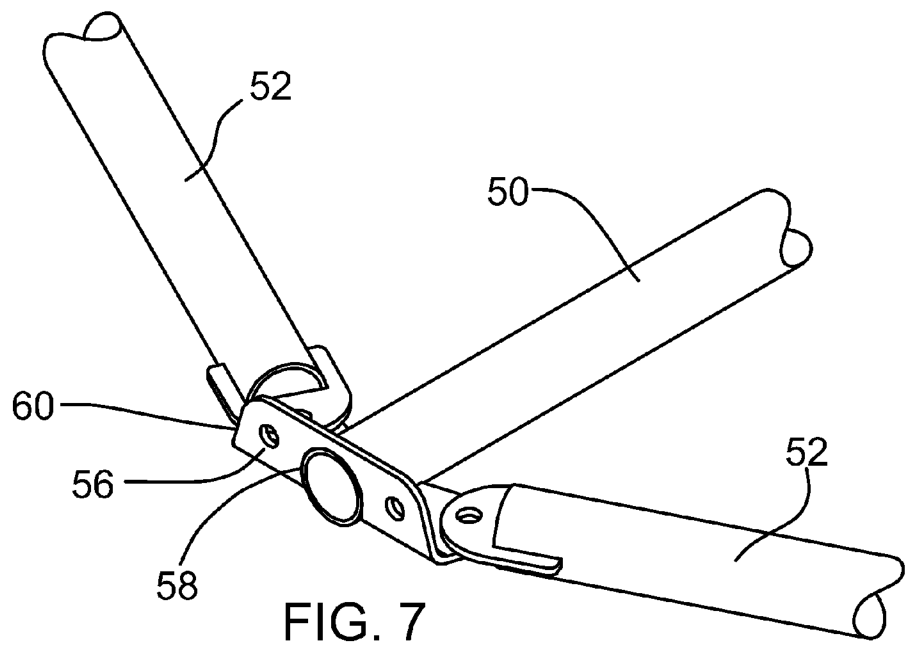
FIG. 7
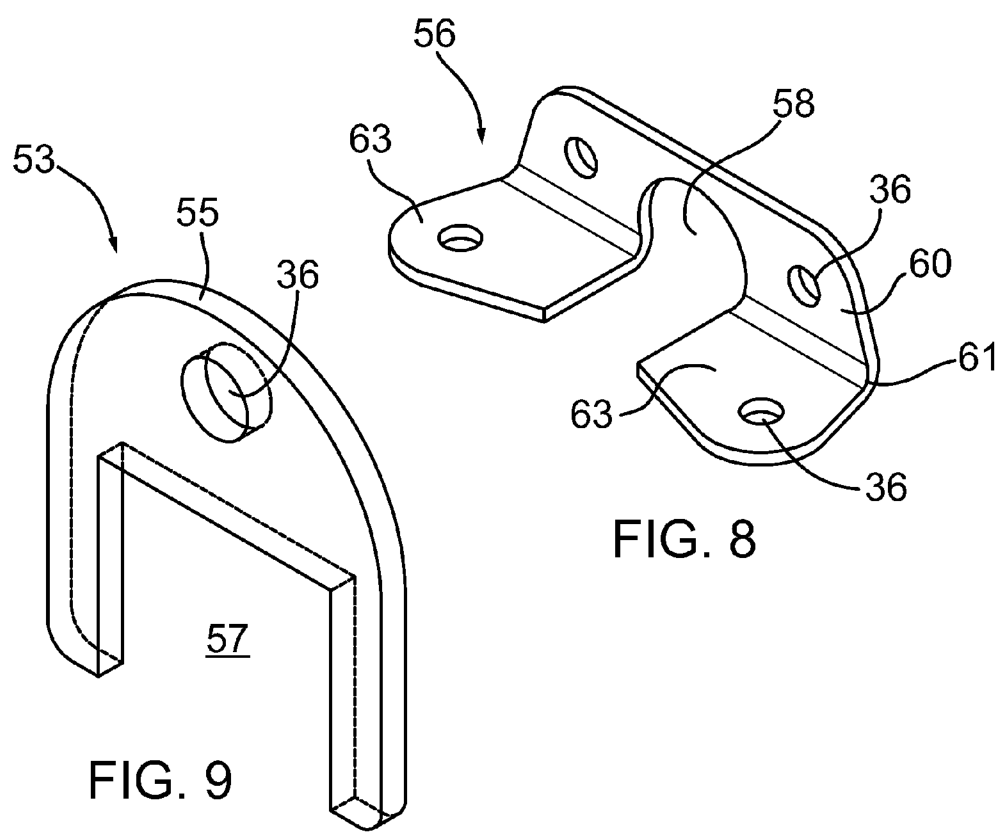
FIG. 8
FIG. 9

MODULAR SUPPORT SYSTEM

TECHNICAL FIELD

The invention relates to a modular support system or structure. More specifically, the invention relates to a modular support system or structure wherein a uniform series of components can be easily transported, assembled/disassembled and/or modified/adapted for a particular application, in particular, a conveyor support system.

BACKGROUND

Support systems for providing structural support for a particular application, such as a conveying system, are generally constructed of a variety of components made from sections of standard angle iron, C-channels or HSS (hollow structural section). These components are used to form the conveyor chords and lattice frames, for example. Therefore, in order to form a section of conveyor frame, various pieces of materials typically need to be cut to size and welded together to form the frame section. The process for forming a section of conveyor frame is rather labour intensive and, once assembled, still requires machine work (drilling, etc.) in order to accommodate the conveyor roller assemblies and other conveyor accessories. As well, once the complete frame structure is built for a specific application, there is little flexibility to the design in order to allow for changes in belt width or overall length of the support structure.

Therefore, there is a need for a support system that is less complex in structure and that can be easily transported and quickly and easily assembled/disassembled whether it be on site or in a more remote location in the field. Furthermore, there is a need for a support system that can be easily modified or customized for a particular application.

SUMMARY OF THE PRESENT DISCLOSURE

In accordance with an example embodiment of the present disclosure, there is provided a frame module for a modular support system, comprising a pair of elongate side frames arranged in laterally spaced-apart relationship, each side frame being formed by profile cutting and roll forming an elongate, metal plate so that the side frame has an elongate main section and two longitudinal flanges on opposite longitudinal edges of the main section, the main section and the flanges each having at least one series of holes distributed along its respective length, the at least one series of holes in each flange including a plurality of fastener holes. A plurality of connecting frame members extend between and detachably connect the side frames and a plurality of detachable fasteners attach opposite ends of the connecting frame members to the side frames by means of the longitudinal flanges on the side frames and the fastener holes formed therein.

In accordance with a further example embodiment of the present disclosure there is provided a frame module for a modular support system, comprising a pair of elongate side frame members arranged in laterally spaced-apart relationship; a plurality of laterally-extending frame members arranged intermediate the elongate side frame members and extending generally perpendicular thereto, each laterally-extending frame member having opposed ends; and a plurality of transverse frame members arranged intermediate the elongate side frame members, each transverse frame member being arranged at an acute angle with respect to the laterally-extending frame members. A plurality of connectors each receive and is connected to an end of one of the laterally-extending frame members and is connected to at least one end of one of the transverse frame members. A plurality of bolt holes are formed in the elongate side frame members and a plurality of fasteners are mounted in the plurality of bolt holes for securing at least the connectors to the elongate side frame members. The connectors detachably secure the transverse frame members at said acute angle with respect to the laterally-extending frame members and detachably and rigidly connect the elongate side frame members in the laterally spaced-apart relationship.

In accordance with another example embodiment of the present disclosure there is provided a modular support system comprising at least one truss frame module, said truss frame module comprising a pair of elongate frame members arranged in laterally spaced apart relationship, each elongate frame member comprising a vertical main section, upper and lower edges and opposed end edges; an integrally extending top flange that extends horizontally along the upper edge of the vertical main section and an integrally extending bottom flange that extends horizontally along the lower edge of said vertical main section; a first set of bolt holes formed in the top and bottom flanges at regularly spaced intervals along the length thereof; a second set of bolt holes formed in the vertical main section; and a plurality of access openings formed in the vertical main section. The truss frame module includes a plurality of laterally-extending frame members arranged intermediate the elongate frame members and extending substantially perpendicular thereto, each laterally-extending frame member having opposed ends, and a plurality of transverse frame members arranged intermediate the elongate frame members, each transverse frame member being arranged at an acute angle with respect the laterally-extending frame members, each transverse frame member having opposed ends. A plurality of connectors each connected to an end of one of the laterally-extending frame members and connected to at least one end of one of said transverse frame members. These connectors secure said transverse frame members at said acute angle with respect to the laterally-extending frame members and rigidly and detachably connect said elongate frame members in said laterally spaced-apart relationship. The modular support system further includes at least one channel frame module comprising a pair of elongate frame members arranged in laterally spaced apart relationship, each elongate frame member comprising a vertical main section and upper and lower edges and opposed ends; an integral top flange that extends horizontally along the upper edge of said vertical main section; an integral bottom flange that extends horizontally along the lower edge of said vertical main section; and bolt holes formed in the top and bottom flanges at regularly spaced intervals along the length thereof. A plurality of laterally-extending frame members are arranged intermediate the elongate frame members and extend substantially perpendicular thereto, each laterally-extending frame member having opposed ends. A plurality of transverse frame members are arranged intermediate the elongate frame members, each transverse frame member being arranged at an acute angle with respect the laterally-extending frame members, each transverse frame member having opposed ends. The channel frame module also includes a plurality of connectors, each connector connected to an end of one of said laterally-extending frame members and connected to at least one end of one of said transverse frame members. These connectors secure the transverse frame members at said acute angle with respect to said laterally-extending frame members and rigidly and detachably connect the elongate frame members in said laterally spaced-apart relationship. A transition connecting arrangement interconnects the truss frame module and the channel frame module.

BRIEF DESCRIPTION OF THE DRAWINGS

Exemplary embodiments of the present disclosure will now be described, by way of example, with reference to the accompanying drawings, in which:

FIG. 7 is a detail view in perspective showing how three pipe connectors are secured to a butterfly-style connecting device;

FIG. 8 is a perspective view of the butterfly-style connecting device shown in FIG. 7; and FIG. 9 is a detail view in perspective showing a metal connecting tab mountable on each end of a transverse connecting frame.

DETAILED DESCRIPTION OF EXEMPLARY EMBODIMENTS

Figure 1:
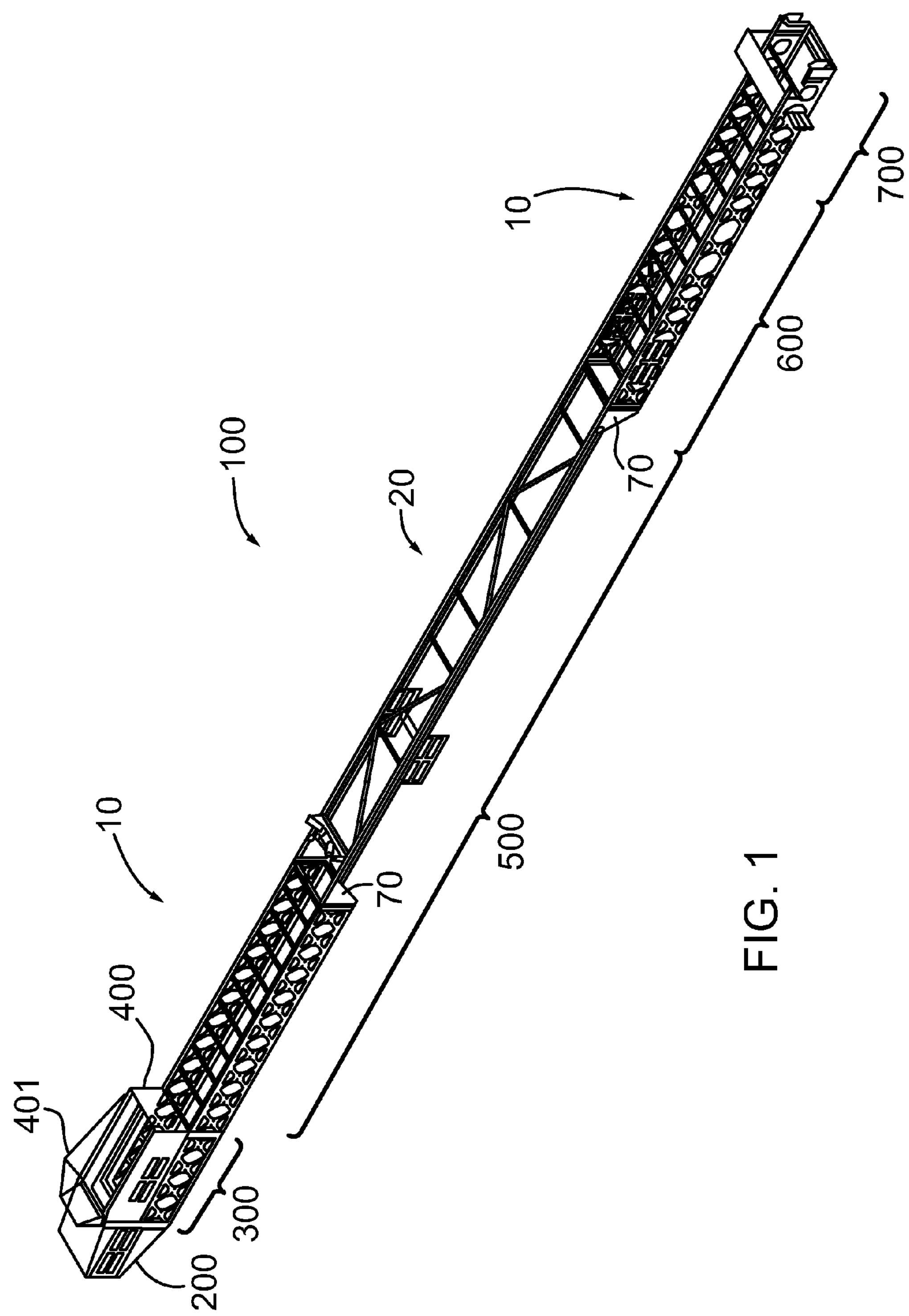
FIG. 1 is a perspective view of an exemplary embodiment of a modular support system in the form of a conveyor support system according to the present disclosure.

Referring now to FIG. 1, there is shown an exemplary embodiment of a modular support system 100 according to the present disclosure. In the subject exemplary embodiment, the support system 100 is intended for use as a conveyor support frame to support an elongate conveying medium that is not shown in the drawings for ease of illustration of the underlying support frame structure. However, the elongate conveying medium may be in any suitable form as is known in the art such as a belt conveyor medium or a series of rollers, etc.

The modular support system 100 is comprised of individual frame sections or modules 10, 20 each of which is formed by a series of standardized components. The individual frame modules 10, 20, or combinations thereof, are secured together, typically end-to-end to form the overall support system 100. While the following exemplary embodiment is described primarily in connection with a conveyor frame or conveyor support system, it will be understood that the modular support system 100 described herein is not necessarily limited to use as a conveyor frame. More specifically, it will be understood that the modular support system can have a variety of uses, for example, the modular support system 100 can be used for purposes such as temporary bridging (i.e. a military bridge) or as a support structure for pipes such as large diameter pipes used in oil processing plants and/or refineries.

Figure 2:
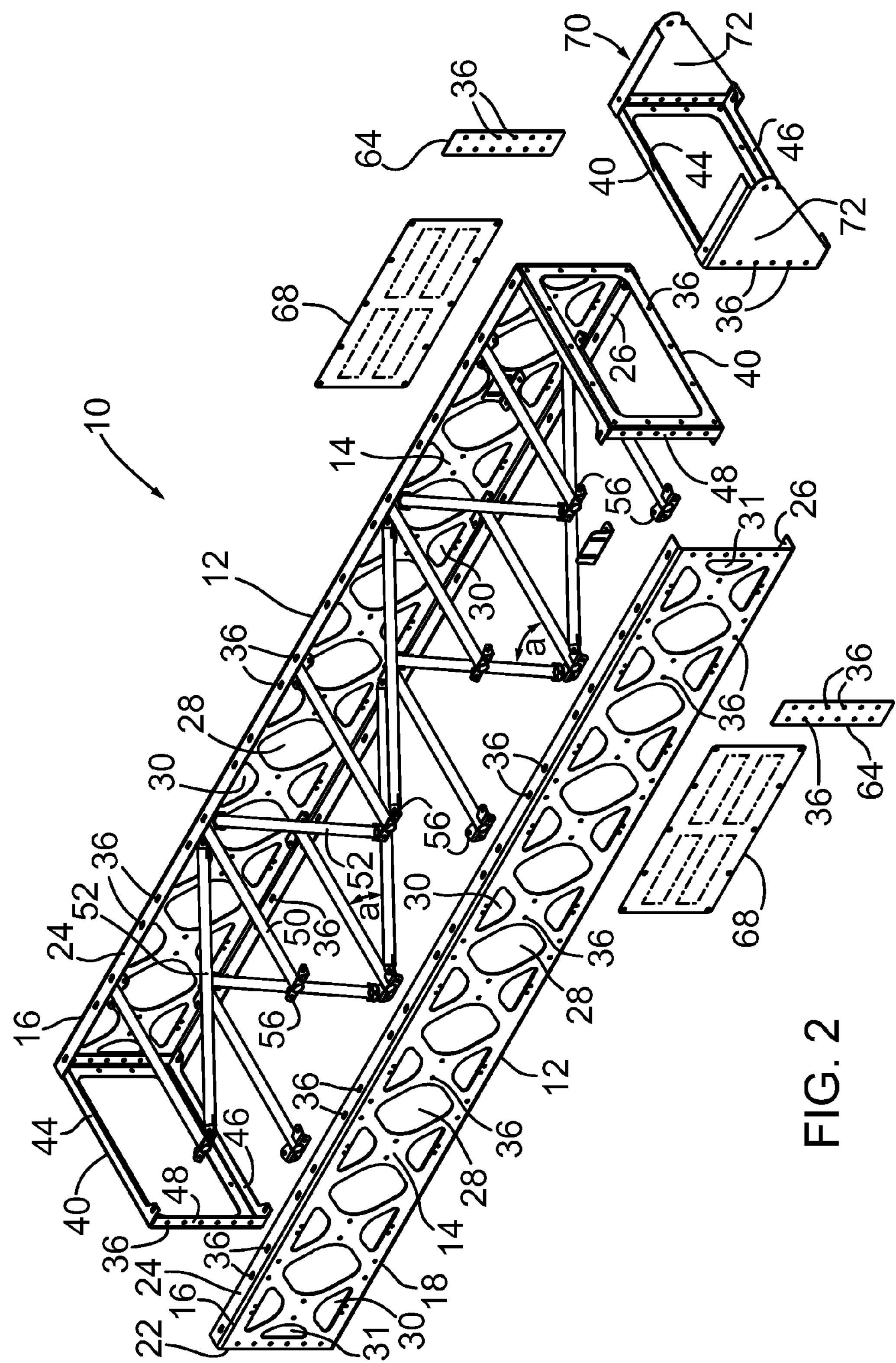
FIG. 2 is an exploded perspective view of an exemplary embodiment of a truss frame module of the modular support system as shown in FIG. 1.
Figure 2A:
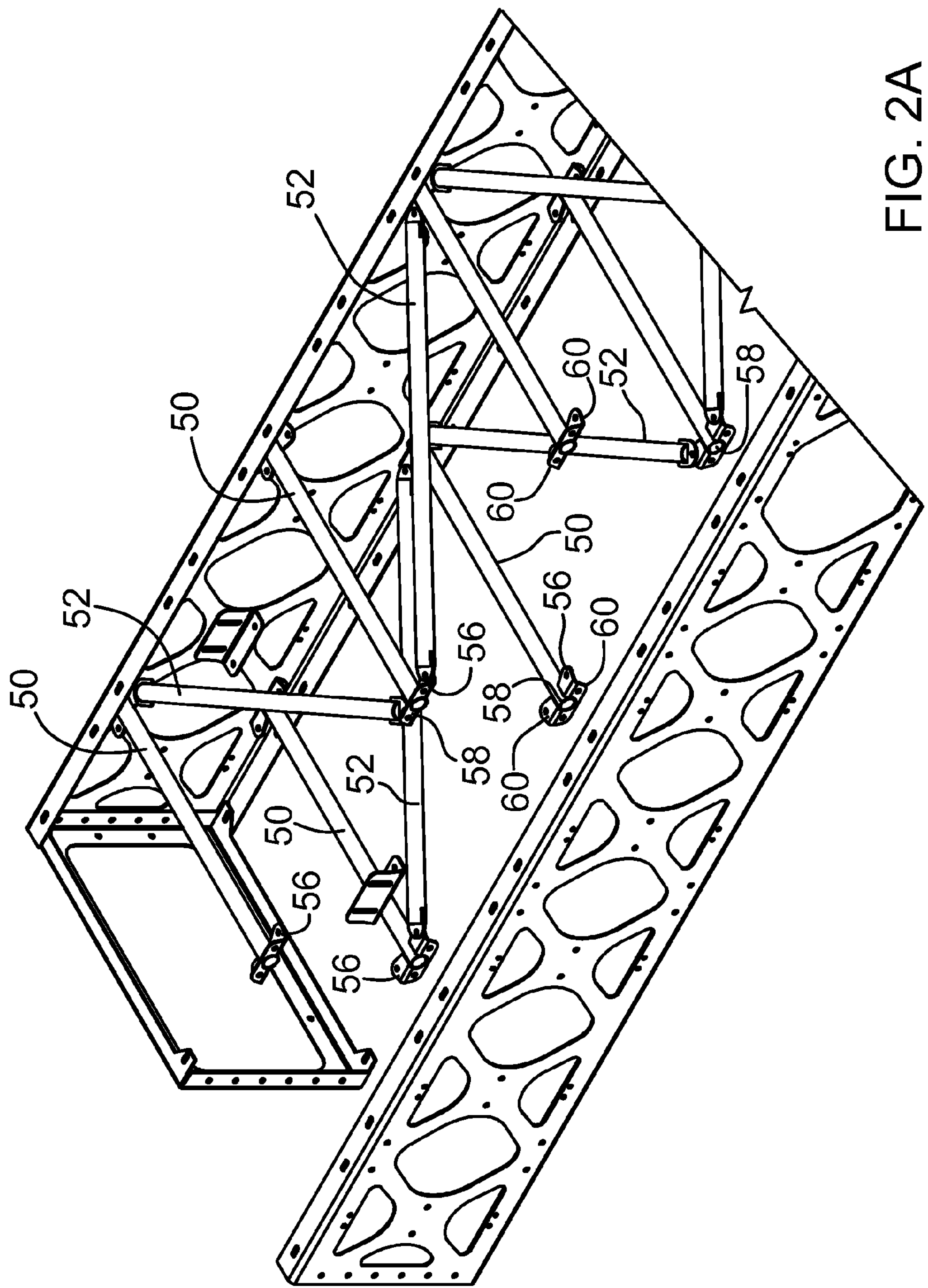
FIG. 2A is a more detailed view of a portion of the truss frame module shown in FIG. 2.

Referring now to FIG. 2 there is shown an exploded perspective view of an exemplary embodiment of one of the primary frame modules, a truss frame module 10, which forms part of the modular support system 100 shown in FIG. 1. The truss frame module 10 is made from a series of standardized components that are bolted together so that the truss frame module 10 can be easily transported to and assembled at a job site or a particular location in the field as no specialized machining is required for assembly. As shown in FIG. 2, the truss frame module 10 is comprised of a pair of large, elongate frame members 12 arranged laterally spaced-apart and generally parallel to one another. Each of these frame members 12 is substantially identical to the other and is preferably made by profile cutting and roll forming a single or unitary elongate metal plate. The profile cutting can be done by laser. Each frame member 12 has a vertical main section 14 with top and bottom edges 16, 18 and opposed end edges 22. Integrally extending along the top and bottom edges 16, 18 of each main section 14 is an upper flange 24 and a lower flange 26. The upper and lower flanges 24, 26 extending horizontally from the top and bottom edges 16, 18. Accordingly, the main sections 14 have a somewhat elongated C-shaped cross-section as can be seen in FIG. 2. It will be understood that while the terms “top”, “bottom”, “upper” and “lower” have been used in connection with certain features of the elongate frame members 12, these terms have been used for illustration purposes and, as will be described in further detail below, are not intended to be limiting since the design of the elongate frame members 12 allows them to be reversed and/or inverted and to function in the same manner as described herein.

Each of the main sections 14 has a number of access holes or openings 28, 30 formed therein. As shown in the drawings, a first set of larger access openings 28 are approximately diamond shape and are arranged so as to be longitudinally spaced-apart along the length of the vertical main section 20 of each frame member 12. A second set of access openings 30 comprise a series of smaller holes or openings that are approximately semi-circular in shape. Access holes 30 are generally arranged intermediate the longitudinally spaced-apart, larger access holes 28 and are primarily located proximal the top and bottom edges 16, 18 of the main section 14. A third set of access holes 31 can also be provided which access holes 31 are also approximately semi-circular in shape but are somewhat smaller than the second set of access holes 30 and are located along the end edges 22 of the main section 14. Access holes 28, 30, 31 are formed at the time the frame members 12 are profile cut, preferably by a laser cutting operation. In the context of a conveyor assembly, access holes 28, 30, 31 provide for mounting of idlers, impact beds, e-stop brackets, electrical supports and safety guards or guarding as well as access to any other components or additional equipment that is mounted on or within the overall support structure 100.

While access holes 28, 30, 31 have been described and shown in the drawings as being approximately diamond or semi-circular in shape, it will be understood and appreciated by persons skilled in the art that alternate shapes are possible and can be incorporated into the design of the frame members 12 without departing from the scope of the present disclosure.

A series of bolt holes 36 are formed along both the upper flange 24 and lower flange 26 at regular spaced-apart intervals along the length of the flanges 24, 26. Bolt holes 36 are formed as mirror images on the upper and lower flanges 24, 26 and therefore the main frames 12 can be inverted or reversed and can still connect to other modular components. Bolt holes 36 can also be provided at regular intervals in the vertical main section 14 interspersed between the other access holes 28, 30, 31 formed therein. The bolt holes 36 that are spaced-apart at intervals along the length of the upper flange 24, in the context of an elongate conveyor support structure, allow for appropriate idler or roller spacing along the length of the support structure 100 based on the particular design and desired capacity for the structure. These bolt holes are also formed when the side frame members are profile cut using laser cutting.

Interior frame members 40 are positioned at respective end edges 22 of the main frames 12. Interior frame members 40 are generally rectangular members having an outer face 42, upper and lower flanges 44, 46 extending from top and bottom edges of the outer face 42 and side flanges 48 extending from the sides of the generally rectangular outer face 42. The interior frame members 40 have substantially the same vertical height as the main section 14 of elongate frame members 12 so as to fit snugly between the upper and lower flanges 24, 26 of the frame members 12. The interior frame members 40 also have bolt holes 36 formed in the upper, lower and side flanges 44, 46, 48, the location and spacing of the bolt holes 36 corresponding to the location and spacing of the corresponding bolt holes 36 formed in the elongate frame members 12 thereby allowing the interior frame members 40 and the elongate frame members 12 to be secured together using bolts or any other suitable fastening means to form the main frame structure of the truss frame module 10. Bolt holes 36 can also be formed in the outer face 42 of the interior frame members 42 thereby allowing additional components and/or additional frame structures or modules to be attached or fastened thereto.

Truss frame module 10 also comprises laterally-extending frame members 50 and transverse frame members 52 that are secured between the elongate frame members 12 along the upper and lower edges 16, 18 thereof. The laterally-extending frame members 50 and the transverse members 52 determine the overall width of the truss frame module 10 based on the length of laterally-extending and transverse frame members 50, 52. Accordingly, a variety of lengths of laterally-extending and transverse frame members 50, 52 can be provided which allows for the truss frame module to be modified or customized to a particular width depending upon the specific application. In the case of a conveyor support structure, the width of the support structure dictates the width of conveyor belt that may be used.

Laterally-extending frame members 50 are secured at regularly-spaced intervals along the length of the truss frame module 10 and extend generally perpendicular to the vertical main section 14 of the elongate frame members 12 interconnecting the elongate frame members 12 in their laterally spaced-apart relationship. Transverse frame members 52 extend at an acute angle, $\alpha$, between adjacent laterally-extending frame members 52. The transverse frame members 52 extend at the acute angle $\alpha$ in alternating directions between the adjacent laterally-extending frame members 50 thereby forming a “zig-zag” pattern along the length of the truss frame 10 module. As shown in the example embodiment of FIG. 2, each transverse frame member 52 positioned along the top edge 16 of the frame members 12 extends at an opposite angle to the transverse frame member 52 positioned directly below along the bottom edge 18 of the frame members 12, although this is not necessarily the case. Each transverse frame member 52 has a steel connecting tab 53 welded to each end. The tab 53 is shown separately in FIG. 9 and it has a rounded outer end 55 and rectangular cut-out 57 in the opposite end. On opposite sides of the cut-out are fingers 59 used to weld the tab to the exterior of the pipe end. A hole 36 is formed in the tab.

Laterally-extending and transverse frame members 50, 52 are also standardized components of the overall modular support structure 100 and are typically in the form of pipes having a predetermined diameter and length. Typically lengths of 2 inch pipe are used for the laterally-extending and transverse frame members 50, 52. The use of pipes is advantageous over other frame members as they are relatively stronger and better able to withstand the forces encountered by the conveyer support. They also can be easier to handle in the field. While the laterally-extending frame members 50 and transverse frame members 52 for a particular truss frame module 10 each have the same length and diameter depending on the design requirements of the truss frame member 10 for a particular application, as mentioned above, the laterally-extending and transverse frame members 50, 52 can be provided in a variety of lengths/diameters that can be used with the elongate frame members 12 to allow the truss frame module to be customized or adapted to a particular application. Since it is the length of the laterally-extending frame members 50 and the interior frames 40 that determine the overall width of the truss frame module 10, these components determine the width of conveyor belt that can be used with the support system 100 when being used for a conveying application. Therefore, the truss frame module 10 can be easily adapted to accommodate a conveyor belt of a different width simply by changing the length of the laterally-extending and transverse frame members 50, 52 and interior frames 40 while the remaining components of the truss frame module 10 can remain unchanged.

Butterfly-style connectors 56 are used to interconnect the ends of the transverse frame members 52 to the corresponding end of the laterally-extending frame members 50. Butterfly connectors 56 are brackets having a generally L-shaped cross-section in an end view and are formed with a central opening 58 for receiving and attaching an end of a laterally-extending frame member 50. This connection is shown in detail in FIG. 7 and the connector 56 is shown separately in FIG. 8. The connector 56 can be welded to the end of its frame member 50. Side portions 60 extend on either side of the central opening 58 in a shape that somewhat resembles the shape of a butterfly wing (hence the term “butterfly-style” connector), the side portions 60 each form a right angle bend 61 and each has a horizontal section 63 formed with a bolt hole 36. Each section 63 can be used to connect an end of a transverse frame member 52. The side portions 60 are also provided with bolt holes 36 that allow the butterfly connectors 56 to be bolted (or otherwise detachably fastened) to the frame members 12. As shown in the drawings, the butterfly connectors 56 are shaped so as to snugly fit against a portion of the inside surface of the main section 14 of frame members 12. The butterfly connectors 56 not only facilitate the self-alignment of the laterally-extending and transverse frame members 50, 52 during assembly of the support structure on site or in the field, but also improve the squaring and the rigidity of the overall frame structure. The connectors 56 can also be galvanized after they are formed and welded to the laterally-extending frame member.

Splice plates 64 can be used in order to connect the respective ends of one truss frame module 10 to another similar truss frame structure 10 depending on the design and overall length of the support structure 100 required for a particular application. Each splice plate 64 is in the form of a generally rectangular plate member having approximately the same vertical height as the main sections 14 of frame members 12. A series of bolt holes 36 are formed therein which are vertically spaced apart along the vertical edges of the splice plate 64 which spacing corresponds to the spacing of bolt holes 36 found along the end edges 22 of the main frame members 12 of the truss frame module 10. Any suitable fastener or bolt, such as ⅝ inch diameter bolts, can be used to connect adjacent truss frame modules 10 (or other similar frame module) together by means of the splice plates 64.

Guard plates 68 can be affixed along the outer surfaces of the main frame members 12 of the truss frame module 10 by means of cotter clips or any other suitable fastening means as known in the art. In order to facilitate assembly, bolt holes 36 are provided around the perimeter of guard plates 68 with a spacing that generally corresponds to the spacing of some of the bolt holes 36 provided on the main section 14 of the elongate frame members 12. This facilitates alignment of the components and the overall assembly of the structure. Guard plates 68 serve to close over the access holes 28, 30, 31 formed in the main sections 14 of the frame members 12 for safety and/or aesthetic purposes. While only one guard plate 68 is shown on either side of the truss frame module 10 in FIG. 2, it will be understood that additional guard plates can be positioned adjacent to each other along the length of frame members 12.

In instances where the truss frame module 10 is to be connected to a different frame module other than a truss frame module 10, a frame transition connector 70 can be used, one of which is shown in FIG. 2. Frame transition connector 70 comprises an interior frame member 40 with triangular side plates 72 mounted to the side flanges 48 of the interior frame member 40 which permits the truss frame module 10 to be connected to an adjacent frame module having a different vertical height than the truss frame module 10, as will be described in further detail below. Once again, bolt holes 36 are formed in the triangular side plates 72 which allows the triangular side plates 72 to be easily connected to the interior frame member 40 and which also allows the truss frame module 10 to be connected to the transition connector 70 by means of two splice plates 64 using bolts or any other suitable fastening means.

Figure 3:
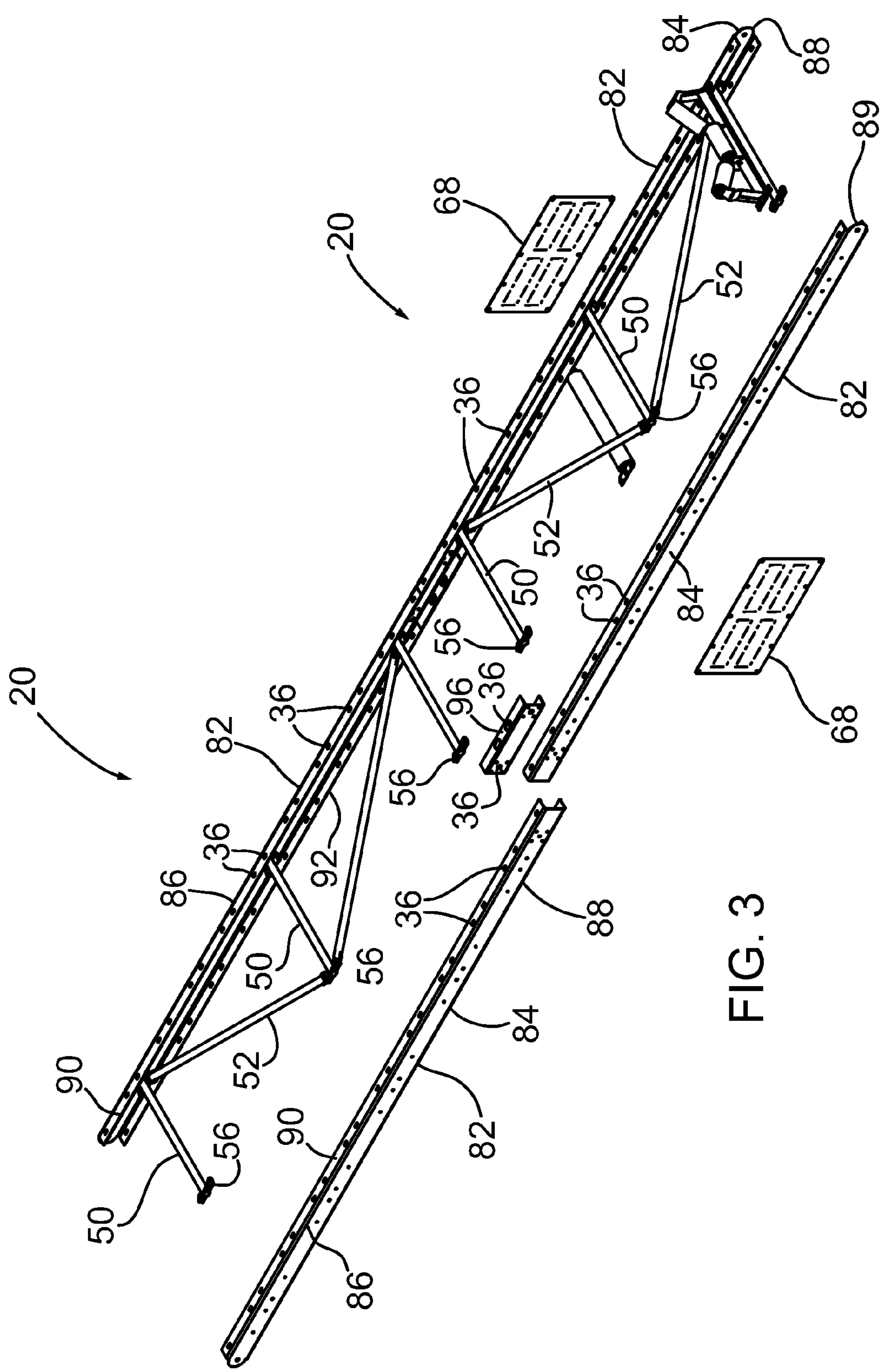
FIG. 3 is an exploded perspective view of an exemplary embodiment of a channel frame module of the modular support system shown in FIG. 1.

Referring now to FIG. 3 there is shown an exploded perspective view of an exemplary embodiment of another primary frame module, a channel frame module 20, according to the present disclosure which forms part of the modular support system 100 shown in FIG. 1.

The channel frame module 20 is also made from a series of standardized components that are bolted together so that the channel frame module 20 can be easily transported to and assembled at a job site or at a particular location in the field. As shown in FIG. 3, the channel frame module 20 is comprised of two elongate side frame members 82 arranged laterally spaced-apart and generally parallel to one another. Each of these side frame members 82 is substantially identical and is preferably made by profile cutting and roll forming. Side frame members 82 have a relatively short, vertical main section 84 with top and bottom edges 86, 88 and opposed end edges 89. Integrally extending along the top and bottom edges 86, 88 of each main section 84 is an upper flange 90 and a lower flange 92. Accordingly, the side frame members 80 have a C-shaped cross-section as can be seen in FIG. 3 that is somewhat reduced in size as compared to the frame members 12 of the truss frame module 10.

Due to the rather short, vertical main section 84 of side frame members 82, no access holes or openings are provided in the main sections 84. Bolt holes 36 are provided at spaced-apart, regular intervals along the upper and lower horizontally extending flanges 90, 92. Bolt holes 36 are also provided at spaced-apart intervals along the length of the main section 84 of the side frame members 80. The bolt holes 36 are formed in upper and lower flanges 90, 92 and in the main section 84 during the profile cutting of the side frame members 82. Accordingly, the side frame members 82 can be formed in a single operation.

As in the truss frame module 10, the bolt holes 36 formed in the upper and lower flanges 90, 92 of the side frame members 82 are formed as mirror images of each other so that the side frame members 82 can be reversed, inverted or stacked one on top of the other to increase the depth and/or strength of the channel frame module 20. Having the bolt holes 36 formed as minor images of each other along the length of the upper and lower flanges 90, 92 also facilitates the assembly of the channel frame module 20 and provides for flexibility in design if a particular support structure requires modifications. The bolt holes 36 provided along the upper flange 90 allow for idlers and/or other conveyor medium components to be attached to the channel frame module at appropriate intervals along the length thereof based on the particular design and requirements of the conveyor medium. The bolt holes 36 provided along the lower flange 92 can be used to attach additional supporting structures to the channel frame module such as support legs (not shown) or other supports that allow the channel frame module 20 to be suspended from above.

Laterally-extending and transverse frame members 50, 52, as used in the truss frame module 10 are also included in the channel frame module 20 to rigidly connect the two side frame members 82 together. Due to the reduced vertical height of the main section 84 of the side frame members 82 only one row of laterally-extending and transverse frame members 50, 52 are used to form the channel frame module 20. As in the truss frame module 10, butterfly connectors 56 are used to connect the ends of the laterally-extending and transverse frame members 50, 52 together and, in turn, to the interior surface of the c-shaped side frame members 82. As indicated, the connectors 56 can be welded to opposite ends of each laterally-extending frame member so they are rigidly connected.

The side frame members 82 of the channel frame module typically are provided in standard lengths, for example in 20 foot sections. Depending upon the overall length required for a particular application, channel frame modules 20 can be arranged end-to-end to create the desired overall length. Splice connectors 96 in the form of small lengths of C-frame members having corresponding bolt holes 36 formed therein are used to connect the end of one channel frame module 20 to an adjacent channel frame module 20 using bolts or any other suitable fastening means. Guard plates 68 can also be attached to the outer surface of the main sections 84 of the side frame members 80 in a similar manner as described in connection with the truss frame module 10 described above.

Depending upon the particular application, a modular support system 100 can be easily assembled using various combinations of truss frame modules 10 and channel frame modules 20 connected together by means of splice plates 64 and splice connectors 96 and/or frame transition connectors plates 70 to create a generally elongate support structure. Truss frame modules 10 and/or channel frame modules 20 can also be stacked one on top of each other in order to form a frame structure having a particular height or depth. Accordingly, the modular support system 100 disclosed herein can be used to form various configurations of frame structures using the same generally standardized set of components. Furthermore, since all components of the truss frame module and channel frame module can be secured together by bolts and all main components have corresponding bolt holes 36 formed therein, the modular support system can be easily assembled and/or disassembled without welding or other machining operations. The exemplary embodiment of the modular support system 100 in use as a conveyor frame support structure, as shown in FIG. 1, will now be described in further detail with reference being made to FIGS. 4-6.

As shown in FIG. 1, the modular support system 100 of the conveyor frame support structure is comprised of a tail section 200, a loading impact section 300, a loading hopper section 400 and hopper 401, a main conveyor body section 500 comprised of both truss frame modules 10 and channel frame modules 20, a gravity take-up section 600 and a final terminus section 700.

Figure 4:
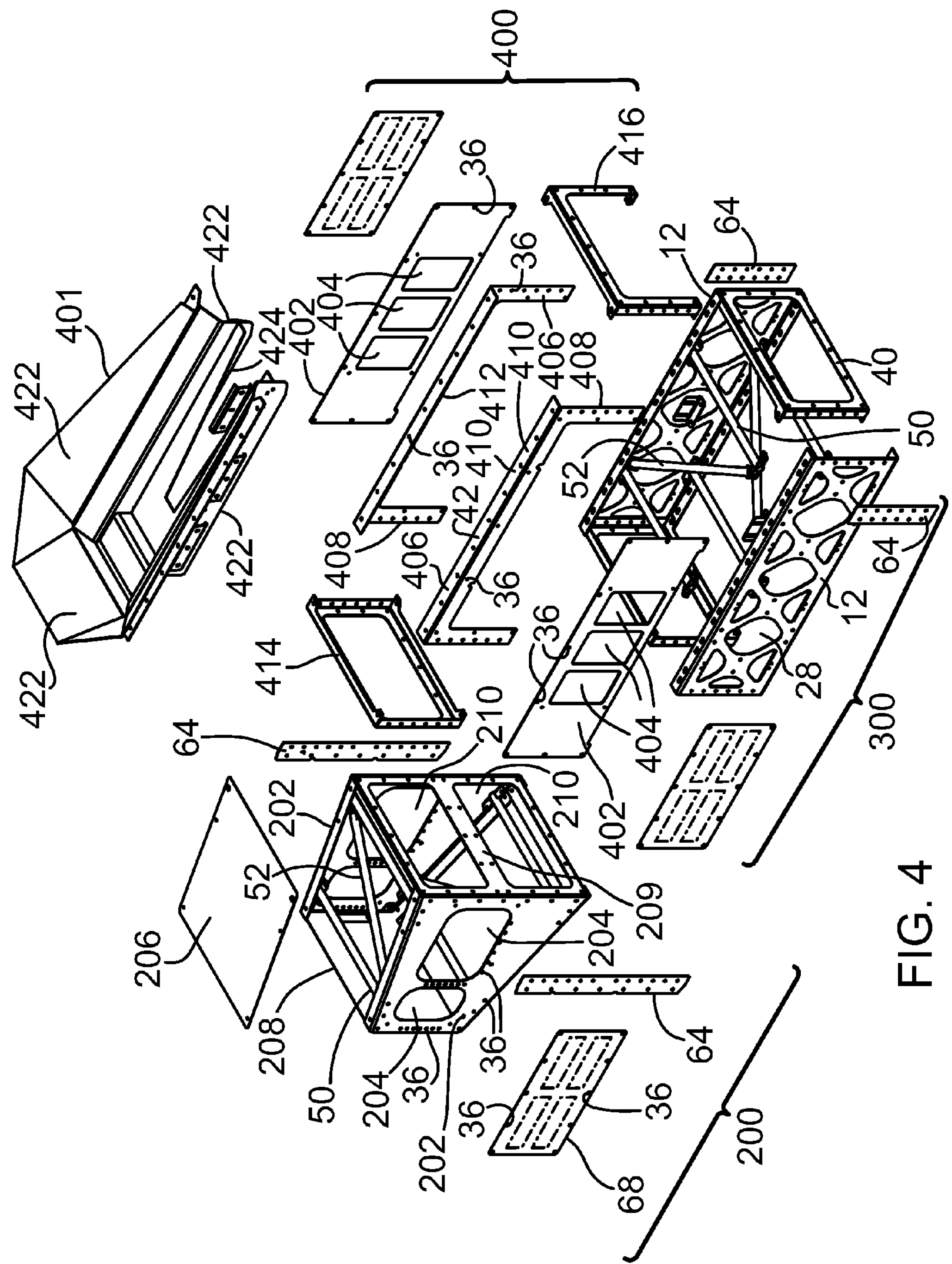
FIG. 4 is an exploded perspective view of a portion of the conveyor support system shown in FIG. 1.

FIG. 4 shows an exploded perspective view of an exemplary embodiment of the tail section 200, loading impact section 300 and loading hopper section 400 of the conveyor frame support structure shown in FIG. 1. As shown, the tail section 200 is comprised of a pair of laterally spaced side plates 202 that are provided with access openings 204 that allow for inspection, installation, maintenance of mechanical equipment associated with the conveying medium that are mounted/installed within the tail section 200. Access openings 204 can also serve as access openings for mounting grease-filled take-ups or other standard fixed mountings associated with tail pulley bearings of the conveying medium as is known in the art.

The access openings 204 are effectively closed over by guard plates 68 that are retained or secured in place by cotter clip or any other suitable fastening means. Bolt holes 36 are also provided in the side plates 204 to allow for easy assembly and/or attachment of other components associated with the structure.

Side plates 204 are rigidly connected together by laterally-extending and transverse frame members 50, 52. The distance by which the side plates 204 are spaced apart determines the overall conveyor width. Butterfly connectors 56 (not shown) are also used to connect the ends of the laterally-extending and transverse frame members 50, 52 to the interior surface of the side plates 204 in a similar manner as described above in connection with the truss and channel frame modules 10, 20.

A top cover 206 is connected to the upper edges of side plates 204 and also serves to interconnect the two side plates 204 thereby completing the integrity of the tail section 200. The top cover 206 also prevents access to the mechanical equipment mounted within the tail section, such as the tail pulley of the conveyor. The top cover 206 is connected to the side plates 204 by any suitable fastening means, such as cotter clips, so as to allow for easy assembly as well as easy removal of the top plate 206 if access to the interior equipment is required.

End plates 208, 209 are also rigidly affixed to the ends of the side plates 206 by means of bolts or any other suitable fastening means. End plates 208, 209 are also formed with access openings 210 so as to provide additional access points to the conveyor equipment mounted within the tail section 200. Providing access openings 204, 210 in the side and end plates of the tail section 200 facilitates inspection and/or repair/maintenance of equipment without having to dismantle large sections of the conveyor structure. The end plates 208, 209 are also provided with bolt holes 36 at spaced-apart intervals in the surfaces thereof to allow for easy assembly of the components.

Loading and impact section 300 generally comprises a truss frame module 10, as described above in reference to FIG. 2, atop which the loading hopper section 400 is mounted. The loading hopper section 400 comprises a pair of generally rectangular side plates 402 that are profile cut and roll formed with large access openings 404 provided therein. The large access openings 404 provide access to equipment or additional components that may be mounted with the frame of the loading and impact section 300.

The side plates 402 are secured to side frame members 406. Side frame members 406 are in the form of an elongated, inverted U-shape with two downwardly depending legs portions 408 and an interconnecting angle portion 410, which includes a horizontally extending flange 412.

Bolt holes 36 are provided in the side plates 402 at regular intervals around the perimeter of the side plates 402 and bolt holes 36 are formed at regular, spaced-apart intervals on the leg portions 408 and the angle portion 410 including the flange 412 to allow for easy assembly of the components. Guard plates 68 can also be affixed to the outer surface of the side plates 402 in the same manner described above (i.e. by means of cotter clips and/or any other suitable fastening means) in connection with the truss frame module 10.

The side plates 402 and side frame members 406 are rigidly connected and laterally spaced apart by means of end frame members 414, 416. In the subject embodiment, end frame 414 is in the same form as the interior frame member 40 described above in connection with the truss frame module 10. End frame 416 is similar to end frame 414 except that it is in the form of an inverted U-shape as opposed to having a complete rectangular shape. End frames 414, 416 have the same vertical height as the side plates 402 and side frame members 406 and fit snugly against the interior surface of the side frame members 402 underneath the upper flange 412.

A loading hopper 401 is mounted on top of the loading hopper section 400, the loading hopper 401 having affixed skirt boarding 422 and a central "Vee"-notch slot 424 for material centering. The loading and impact section 300 and the loading hopper section 400 with hopper 401 are connected together using, for example, ⅝ inch bolts and, together, are connected to the tail section 200 by means of splice plates 64 in the same manner as described above in connection with the truss frame module 10.

Figure 5:
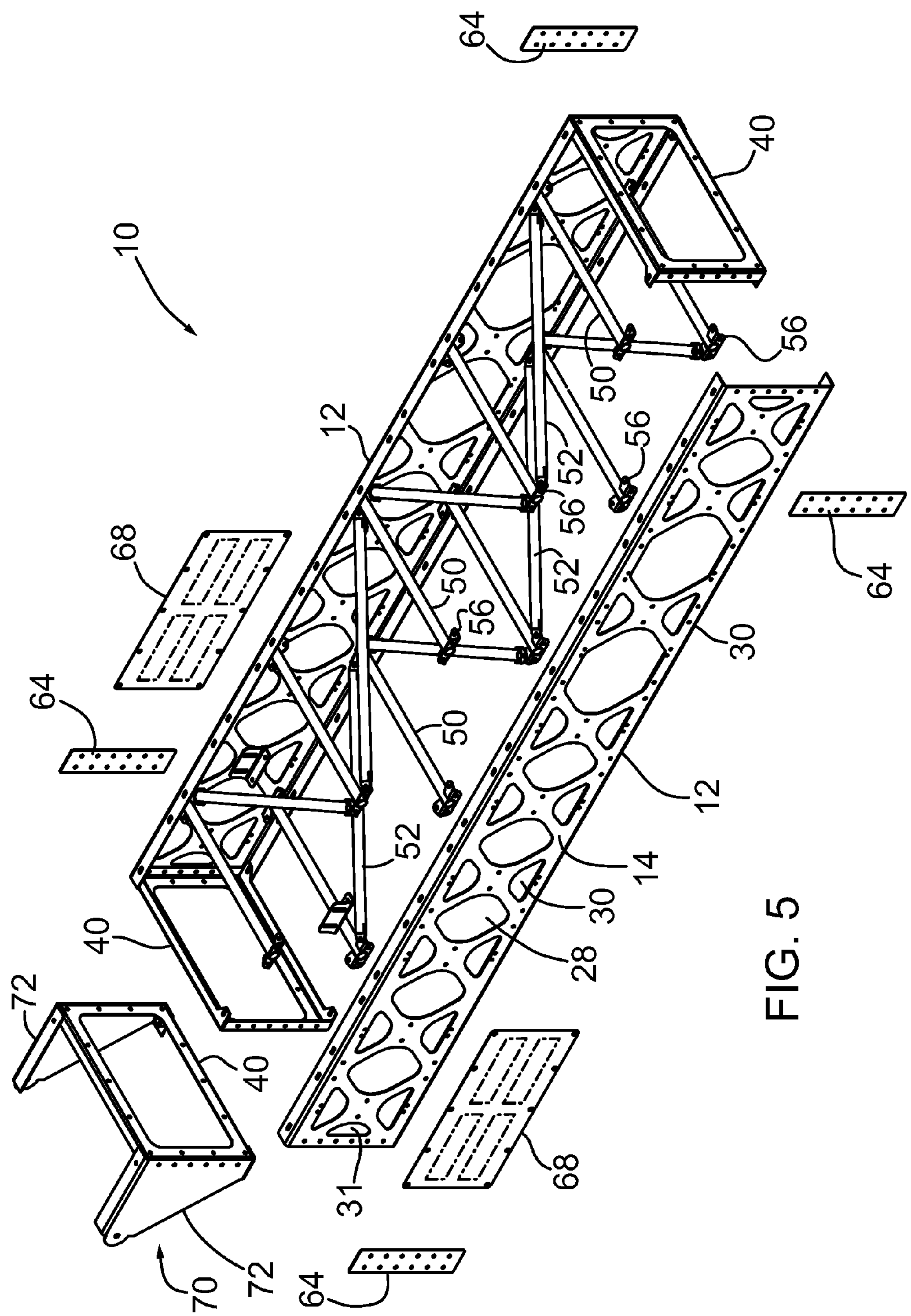
FIG. 5 is an exploded perspective view of another section of the conveyor support system shown in FIG. 1.

The main conveyor body section 500 shown in FIG. 1 includes a truss frame module 10 connected in series with a channel frame module 20. It is over this main section of the support system 100 that the conveying medium travels. Another truss frame module 10 is connected to the end of the central channel frame module 20 and serves as the gravity take-up section 600 of the conveyor support system 100. An exploded perspective view of the gravity take-up section of the support system 100 is shown in FIG. 5 wherein like reference numerals, as used in connection with the description of the truss frame module 10, have been used to identify similar components.

Figure 6:
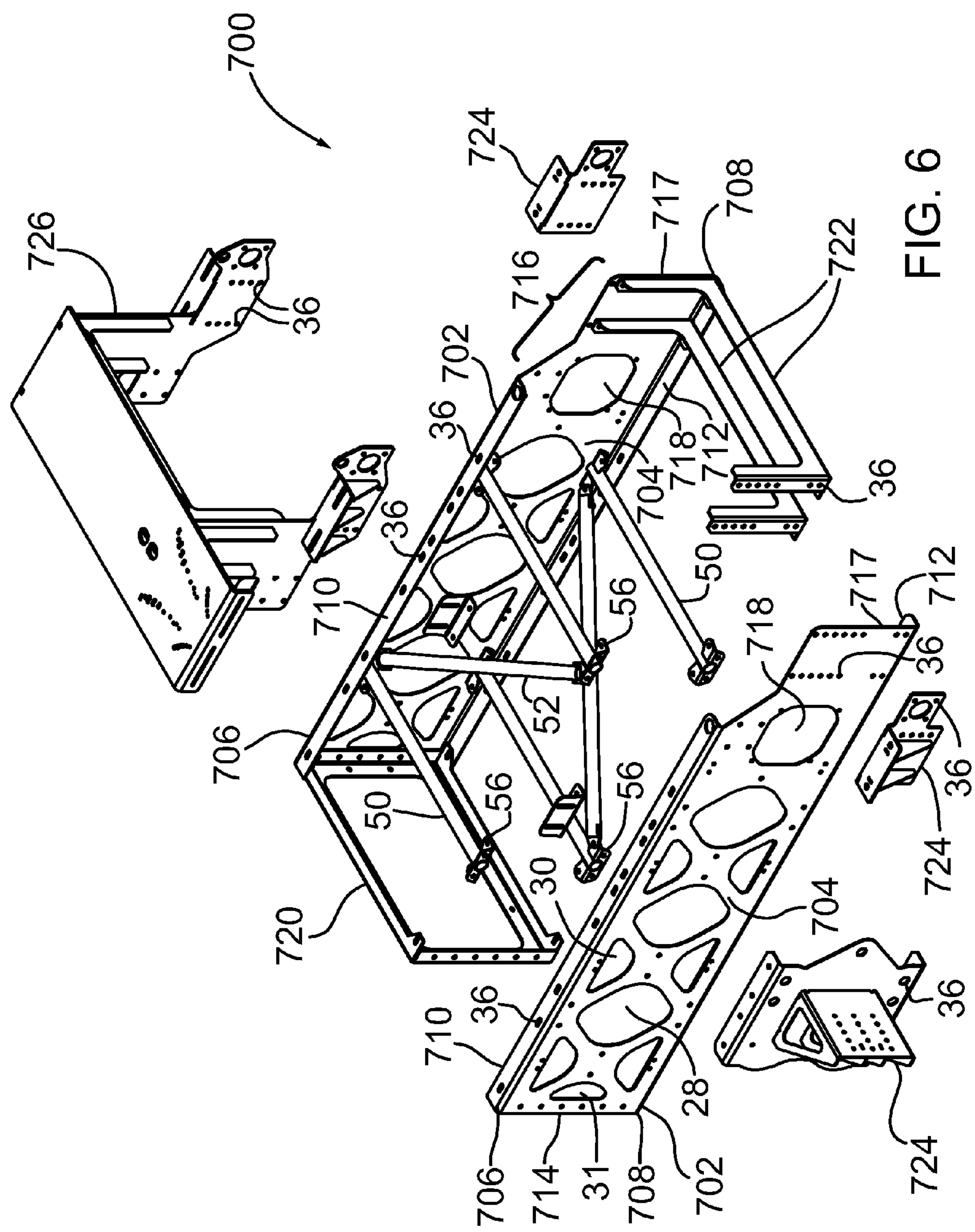
FIG. 6 is an exploded view of another section of the conveyor support system shown in FIG. 1.

The final terminus or head section 700 of the conveyor support system 100 is shown in further detail in FIG. 6. Once again, the head section 700 is comprised of a series of standardized components that are profile cut and roll formed and can be easily transported and assembled on site or in the field. The head section 700 is similar in structure to the truss frame module 10 in that it too comprises a pair of frame members 702 that are arranged laterally spaced-apart and generally parallel to one another. Each of these frame members 702 is substantially identical and is preferably made by profile cutting and roll forming. Each frame member 702 has a vertical main section 704 with top and bottom edges 706, 708. Integrally extending along the top and bottom edges 706, 708 of each main section 704 is an upper flange 710 and a lower flange 712. Each frame member 702 has one end 714 with a vertical end edge and a second end 716 that has a stepped or tapered profile. The second end 716 also terminates in a vertical end edge 717 but of reduced height as compared to the vertical height of the main section 704.

Access holes 28, 30, 31 as described in connection with the truss frame module 10 are formed in the main sections 704 of each of the frame members 702. An additional access hole 718 is formed in the main section 704 proximal the second end 716 of the frame member 702. Access hole 718 is generally square in shape although other shapes are contemplated and the present disclosure is not intended to be limited to the specific shape of openings shown in the drawings. Access holes 28, 30, 31, 718 all serve to provide access to equipment mounted within the frame of the terminus or head section 700. Bolt holes 36 are also provided in the main section 704 of the frame members 702 and in the upper and lower flanges 710, 712 to allow for easy assembly as well as to permit other equipment and/or components to be bolted or otherwise connected to the frame members 702.

End frame members 720, 722 are positioned at respective ends 714, 716 of the main frames 702. End frame member 720 is the same as the interior frame member 40 described above in connection with the truss frame module 10 while end frame members 722 are similar to the end frame 416 described in connection with the loading hopper section 400 except that the end frame members 722 are inverted as compared to end frame 416 and therefore are in the form of a U-shape rather than an inverted U-shape. End frames 722 are arranged spaced apart from each other and have the same vertical height as the reduced height portion of the second end 716 of the frame members 702. The end frames 722 fit snugly against the interior surfaces of the frame members 702 and against the horizontal lower flanges 712.

Laterally-extending and transverse frame members 50, 52 are also arranged in between the frame members 702 along the upper and lower edges thereof to rigidly connect frame members 702 in their spaced-apart relationship. As in the truss frame module 10, butterfly connectors 56 are used to connect the ends of the laterally-extending and transverse frame members 50, 52 to the frame members 702.

The second end 716 of the head section 700 is designed so as to accommodate a shaft mounting bracket 724 or a bridge mount 726, which are generally known in the art, for attaching/mounting components of the conveyor system to the terminus or head section 700. The shaft mounting bracket 724 or bridge mount 726 may be used to mount conveyor components, such as speed reducers, and also allows for adjustments in head pulley diameter and pillow block size for the conveying medium. The arrangement of access holes or openings 28, 30, 31, 718 and bolt holes 36 also allow for additional components to be installed, depending on a particular application or design, such as a primary belt scraper (not shown) which can be mounted in place or a multi-discipline torque arm 727. As well, the arrangement of bolt holes 36 and access holes allows for easy placement of the pulley, shaft and bearings of the conveyor design depending on the particular design of the system.

As with the other frame modules described in detail above, the specific belt width of the conveyor system can be easily modified or adjusted simply be replacing the laterally-extending and transverse members 50, 52 and the end frames 720, 722 (or interior frames). Accordingly, the entire support system can be easily modified to accommodate a particular application.

While the above example embodiment has been described in connection with a conveyor system, it will be understood that the support system described herein is not intended to be limited for use in a conveyor system. More specifically, the exemplary embodiments described herein relate to a modular support system comprised of individual frame modules that are interconnected in various combinations and arrangements to provide a suitable support system or structure for a particular application. As the components of the various frame modules (i.e. the truss frame module and the channel frame module) are standardized and easily interchanged, the support system can be easily modified for a particular application and also allows for easy assembly (or disassembly) in the field or onsite.

The components of the modular support system are preferably formed of any suitable sheet metal that is profile cut and roll formed. The components can also be galvanized or painted after they are formed to provide a protective coating and ensure the longevity of the material used to form the components especially in instances where the modular support system is assembled and used in the field.

Furthermore, it will be understood that certain adaptations and modifications of the described exemplary embodiments can be made as construed within the scope of the present disclosure. Therefore, the above discussed embodiments are considered to be illustrative and not restrictive.

Having thus described our invention, we claim:

1. A frame module for a modular support system, comprising:

a pair of elongate side frames arranged in laterally spaced-apart relationship, each side frame being formed by profile cutting and roll forming a single, elongate metal plate so that the side frame has an elongate main section and two longitudinal flanges on opposite longitudinal edges of the main section, said main section and said flanges each having at least one series of holes distributed along its respective length, the at least one series of holes in each flange including a plurality of fastener holes;

a plurality of connecting frame members extending between and detachably connecting said side frames; and a plurality of detachable fasteners attaching opposite ends of said connecting frame members to said side frames by means of said longitudinal flanges on the side frames and the fastener holes formed therein, wherein said connecting frame members include a plurality of elongate laterally-extending frame members each extending substantially perpendicular to the elongate side frames and a plurality of transverse frame members each arranged at an acute angle with respect to the laterally extending frame members.

2. The frame module of claim 1 wherein the at least one series of holes in the main section of each side frame comprises a series of access holes of similar size and shape formed by the profile cutting step for the respective side frame.

3. The frame module of claim 2 wherein the two side frames are substantially identical to each other and are therefore reversible or invertible in order to construct said modular support system.

4. The frame module of claim 1 wherein the at least one series of holes in the main section of each side frame includes a first set of access openings arranged centrally and longitudinally spaced-apart along the length of the main section and at least one additional set of access openings arranged intermediate adjacent ones of said first set of access openings along at least one edge of the respective side frame member, and wherein both the first and second sets of access openings are formed by the profile cutting of said elongate metal plate.

5. The frame module of claim 4 wherein said detachable fasteners include a plurality of butterfly-style connectors each receiving and rigidly attached to one end of a respective one of said laterally-extending frame members and each connected to one end of at least one of said transverse frame members.

6. The frame member of claim 4 wherein said laterally-extending frame members and said transverse frame members extend between and are detachably connected to the longitudinal flanges on both longitudinal edges of the main sections of the side frames.

7. A frame module for a modular support system, comprising:

a pair of elongate side frame members arranged in laterally spaced-apart relationship;

a plurality of laterally-extending frame members arranged intermediate the elongate side frame members and extending generally perpendicular thereto, each laterally-extending frame member having opposed ends;

a plurality of transverse frame members arranged intermediate the elongate side frame members, each transverse frame member being arranged at an acute angle with respect to the laterally-extending frame members;

a plurality of connectors each receiving and rigidly attached to an end of one of said laterally-extending frame members and each connected to at least one end of one of said transverse frame members;

a plurality of bolt holes formed in said elongate side frame members; and a plurality of fasteners mounted in said plurality of bolt holes for detachably securing at least said connectors to said elongate side frame members, wherein said connectors detachably secure said transverse frame members at said acute angle with respect to said laterally-extending frame members and detachably and rigidly connect said elongate side frame members in said laterally spaced-apart relationship.

8. The frame module as claimed in claim 7, wherein said elongate side frame members each comprise:

a vertical main section and upper and lower edges;

an integrally extending top flange that extends horizontally along the upper edge of said vertical main section; and an integrally extending bottom flange that extends horizontally along the lower edge of said vertical main section, wherein said plurality of bolt holes comprise a first set of bolt holes formed in said top and bottom flanges at regularly spaced intervals along the length thereof and a second set of bolt holes formed in said vertical main section.

9. The frame module as claimed in claim 7, wherein each elongate side frame member has a plurality of access openings formed by profile cutting an elongate metal plate and said plurality of access openings in each side frame member include a first set of access openings arranged centrally and longitudinally spaced-apart along the length of said vertical main section; and a second set of access openings arranged intermediate adjacent ones of said first set of access openings along the upper and lower edges of the elongate side frame members.

10. The frame module as claimed in claim 7, wherein said laterally-extending frame members and said transverse frame members are arranged along both top and bottom edges of a vertical main section of each elongate side frame member.

11. The frame module as claimed in claim 7, wherein said connectors are each butterfly-style and have a central opening for receiving and attaching the end of a respective laterally-extending frame member, which is a pipe, and fastening bolts are used to secure said connectors to said elongate side frame members.

12. The frame module as claimed in claim 7, further comprising:

a rectangular interior frame member interconnected between said pair of laterally spaced-apart elongate frame members at each end thereof, wherein the interior frame members detachably and rigidly interconnect said elongate side frame members.

13. The frame module as claimed in claim 7, wherein each elongate side frame member is profile cut by laser and then roll formed from a unitary, elongate steel plate.

14. The frame module as claimed in claim 7, wherein each connector comprises:

a generally L-shaped bracket having a first surface for abutting an interior surface of a respective one of the elongate side frame members, said bracket having a central opening for receiving and attaching an end of one of said laterally-extending frame member and side portions extending on either side of said central opening, each of said side portions formed with a bolt hole for receiving a fastener for securing a respective one of said transverse frame members at said acute angle with respect to said laterally-extending frame member.

15. The frame module as claimed in claim 7, wherein said laterally-extending frame members and said transverse frame members are lengths of 2 inch diameter pipe.

16. A modular support system comprising:

at least two of said frame modules as claimed in claim 7, said at least two frame modules being arranged in series; and splice plates having a series of bolt holes formed therein, said bolt holes being spaced-apart so as to correspond to at least some of said plurality of bolt holes formed in said elongate side frame members, wherein said splice plates are secured to said at least two frame modules thereby securing said at least two frame modules in series.

17. A modular support system comprising:

at least one truss frame module, said truss frame module comprising:

a pair of elongate frame members arranged in laterally spaced apart relationship, said elongate frame members each comprising:

a vertical main section, upper and lower edges and opposed end edges;

an integrally extending top flange that extends horizontally along the upper edge of said vertical main section;

an integrally extending bottom flange that extends horizontally along the lower edge of said vertical main section;

bolt holes formed in said top and bottom flanges at regularly spaced intervals along the length thereof; and a plurality of access openings formed in the vertical main section;

a plurality of laterally-extending frame members arranged intermediate the elongate frame members and extending substantially perpendicular thereto, each laterally-extending frame member having opposed ends;

a plurality of transverse frame members arranged intermediate the elongate frame members, each transverse frame member being arranged at an acute angle with respect the laterally-extending frame members, each transverse frame member having opposed ends;

a plurality of connectors each attached to an end of one of said laterally-extending frame members and connected to at least one end of one of said transverse frame members, wherein said connectors secure said transverse frame members at said acute angle with respect to said laterally-extending frame members and rigidly and detachably connect said elongate frame members in said laterally spaced-apart relationship; and at least one channel frame module, said channel frame module comprising:

a pair of elongate frame members arranged in laterally spaced apart relationship, each elongate frame member comprising:

a vertical main section and upper and lower edges and opposed ends;

an integrally extending top flange that extends horizontally along the upper edge of said vertical main section;

an integrally extending bottom flange that extends horizontally along the lower edge of said vertical main section; and bolt holes formed in said top and bottom flanges at regularly spaced intervals along the length thereof;

a plurality of laterally-extending frame members arranged intermediate the elongate frame members and extending substantially perpendicular thereto, each laterally-extending frame member having opposed ends;

a plurality of transverse frame members arranged intermediate the elongate frame members, each transverse frame member being arranged at an acute angle with respect the laterally-extending frame members, each transverse frame member having opposed ends;

a plurality of connectors each attached to an end of a respective one of said laterally-extending frame members and connected to at least one end of one of said transverse frame members, wherein said connectors secure said transverse frame members at said acute angle with respect to said laterally-extending frame members and rigidly and detachably connect said elongate frame members of the channel frame module in said laterally spaced-apart relationship; and a transition connecting arrangement interconnecting said truss frame module and said channel frame module.

18. The modular support system as claimed in claim 17, further comprising:

at least two truss frame modules arranged in series, each of said truss frame modules being rigidly secured together at adjacent ends by means of bolts.

19. The modular support system as claimed in claim 17, wherein said at least one truss frame module and said at least one channel frame module are formed of galvanized steel components.

* * * * *